(12) United States Patent
Papadimitriou et al.

(10) Patent No.: US 8,799,260 B2
(45) Date of Patent: Aug. 5, 2014

(54) METHOD AND SYSTEM FOR GENERATING WEB PAGES FOR TOPICS UNASSOCIATED WITH A DOMINANT URL

(75) Inventors: Panagiotis Papadimitriou, Menlo Park, CA (US); Prabhakar Krishnamurthy, Pleasanton, CA (US); Frederick Kenneth Schmidt, Califon, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 688 days.

(21) Appl. No.: 12/971,608

(22) Filed: Dec. 17, 2010

(65) Prior Publication Data

US 2012/0158693 A1 Jun. 21, 2012

(51) Int. Cl.
*G06F 17/30* (2006.01)
*G06F 7/00* (2006.01)

(52) U.S. Cl.
USPC .......................................... 707/708; 707/750

(58) Field of Classification Search
USPC ........... 707/706, 708, 736, 750, 776, 999.002
See application file for complete search history.

(56) References Cited

U.S. PATENT DOCUMENTS 7,047,242 B1 * 5/2006 Ponte ..................................... 1/1
8,285,745 B2 * 10/2012 Li et al. ......................... 707/776
2004/0205086 A1 * 10/2004 Harvey et al. ............. 707/103 R
2007/0061303 A1 * 3/2007 Ramer et al. ....................... 707/3
2008/0133479 A1 * 6/2008 Zelevinsky et al. ................ 707/3
2008/0252912 A1 * 10/2008 Sweet et al. ..................... 358/1.2
2009/0094234 A1 * 4/2009 Marvit et al. ...................... 707/5
2009/0292677 A1 * 11/2009 Kim .................................. 707/3
2010/0094853 A1 * 4/2010 Telloli et al. ................... 707/706
2010/0114812 A1 * 5/2010 Williams ......................... 706/52
2010/0250497 A1 * 9/2010 Redlich et al. ................ 707/661
2012/0078711 A1 * 3/2012 Mehta et al. ................ 705/14.45
2013/0268517 A1 * 10/2013 Madhavan et al. ............ 707/722

OTHER PUBLICATIONS

K. Selcuk Candan 1, Wen-Syan Li to be called Selcuk hereafter. Feb. 2002 Title: Reasoning for Web document associations and its applications in site map construction.*

* cited by examiner

*Primary Examiner* — Md. I Uddin
(74) *Attorney, Agent, or Firm* — Brinks Gilson & Lione

(57) ABSTRACT

Techniques are provided for identifying topics that are unassociated with a dominant URL. A set of keywords associated with a topic is identified. A search log is scanned to identify search queries associated with the set of keywords. The identified search queries are grouped into clusters. Clusters associated with similar URLs are merged to generate an extended seed query string. The extended seed query string is analyzed to determine whether it relates to an existing dominant URL. If the extended seed query string is determined to be unassociated with an existing dominant URL, a web page associated with the topic may be generated.

17 Claims, 16 Drawing Sheets

METHOD AND SYSTEM FOR GENERATING WEB PAGES FOR TOPICS UNASSOCIATED WITH A DOMINANT URL

BACKGROUND OF THE INVENTION

1. Field of the Invention

The present invention relates to online advertising and the generation of web pages.

2. Background

A search engine is an information retrieval system used to locate documents and other information stored on a computer system. Search engines are useful for reducing the amount of time required to find information. One well known type of search engine is a Web search engine which searches for documents, such as web pages, on the "World Wide Web" (also known as "the Web"). Examples of such search engines include Yahoo! Search™ (at yahoo.com), Microsoft Bing ™ (at bing.com), Ask.com ™ (at ask.com), and Google ™ (at google.com). Online services such as LexisNexis™ and Westlaw™ also enable users to search for documents provided by their respective services, including articles and court opinions. Other types of search engines include personal search engines, mobile search engines, and enterprise search engines that search on intranets, among others.

To perform a search, a user of a search engine typically enters a query into a search box of the search engine. The query contains one or more words/terms, such as "hazardous waste" or "country music." The terms of the query are typically selected by the user as an attempt to find particular information of interest to the user. The search engine returns a list of documents relevant to the query. For a Web-based search, the search engine typically also returns a list of uniform resource locator (URL) addresses for the relevant documents, which is displayed to the user in a search results page. If the scope of the search resulting from a query is large, the returned results may include thousands or even millions of documents.

"Sponsored search" refers to a form of Internet advertising/marketing that enables advertisers to increase their visibility in the results page of a search engine query. According to sponsored search, an advertiser may pay or provide other compensation for having an advertisement appear in a sponsored section of the results page for one or more particular queries. A user who enters one of the queries into the search engine is provided with a results page that includes the advertisement in the sponsored search section. The sponsored search section is prominently displayed in the results page, to enable the user to easily see and interact with the advertisement. In this manner, an advertiser is enabled to provide advertisements to users that are directly related to their queries, and a search engine owner/operator is enabled to further monetize the search engine.

Sponsored search advertisers are enabled to match their advertisements with desired search results by bidding on keywords. An auction may be performed among multiple advertisers who bid in order to have their advertisements shown next to search results for specific keywords. An advertisement associated with submitted keywords that match the search query (and having a winning bid) may be displayed on search results pages for the search query. Output bidding is another bidding mechanism for sponsored search, where advertisers bid on search result URLs (uniform resource locator) rather than on keywords in input search queries. For example, an advertiser may want an advertisement to appear whenever search results include a site having the URL imdb.com instead of bidding on keywords that lead to this site (such as movie titles, actor names, etc).

The search engine entry box has become the starting point for many tasks related to the Web. It enables searching to be performed, but also enables users to navigate to websites. Often, a search, or a group of related searches will cause a search system to retrieve results pointing to the same URL that is dominant within the content domain associated with the search query. For example, searches associated with movie related topics often lead to the Internet Movie Database™ (at imdb.com) as a search result. Searches associated with weather related topics often lead to The Weather Channel™ (at weather.com) as a search result. Other groups of related searches may lead to other associates URLs that dominate the search space.

As such, for some topics, URLs exist that span an entire or large domain of keywords related to the topics, appearing among the top search results in response to queries for those topics. Utilizing output bidding, advertisers may bid on the URL and gain excellent advertisement coverage a large number of related keywords. However, there are many topics without a dominant URL that comprehensively covers the topics.

BRIEF SUMMARY OF THE INVENTION

Various approaches are described herein for, among other things, identifying topics or clusters of closely related keywords that lack a topic or dominant URL. Furthermore, various approaches are described herein for generating or creating content, such as titles or body text of web pages, for the identified topics or clusters.

The described approaches may generate recommendations of topics that lack or are unassociated with a dominant URL, and may provide a set of relevant keywords and/or recommendations for titles or snippets that may be used to create a web page for the recommended topics. The described approaches may determine a set of one or more scores. For instance, a first score that denotes a coverage of a topic by a single URL (e.g., a high score indicates the existence of a dominant URL) may be determined A second score that indicates a level of advertiser interest in the topic (e.g., a score that indicates a number of advertisers bidding on the keywords for the topic) may be determined. Furthermore, a third score that indicates a level of user interest (e.g., a score that indicates the volume of search queries associated with the topic) may be determined. Such approaches may be useful to publishers, who may attract interested users and thus attract advertisers who wish to advertise to those users. For example, publishers using the approaches described herein may generate a content page around topics unassociated with dominant URLs, attracting users and advertisers. Any user may use the approaches described herein to determine dominant URLs, and to generate content pages for the determined dominant URLs.

In one method implementation, a query topic unassociated with a dominant URL is determined A seed query string associated with a query topic is identified, and a log of search queries is scanned to identify search queries associated with the seed query string. Identified search queries are grouped into clusters. Each of the clusters is associated with at least one URL returned by a search engine when performing a search for information using one or more of the identified search queries. Clusters associated with similar URLs are merged to generate an extended seed query string. If the extended seed query string is determined to be unassociated with a dominant URL, information identifying a query topic associated with the extended seed query string is generated.

In another method implementation, a web page associated with a topic is created. Information associated with a query topic determined to be unassociated with a dominant URL is received, content for a web page related to the query topic is generated, and a web page that includes the generated content is created.

In another implementation, a system for outputting content to be displayed by a web page is provided. The system includes a topic identification module that is configured to identify one or more topics unassociated with a dominant URL. The system also includes a content generation module that is configured to generate content for a web page associated with the identified one or more topics unassociated with the dominant URL.

Computer program products are also described herein. The computer program products include a computer-readable medium having computer program logic recorded thereon for determining dominant URLs, generating content pages for determined dominant URLs, and for enabling further embodiments, according to the implementations described herein.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
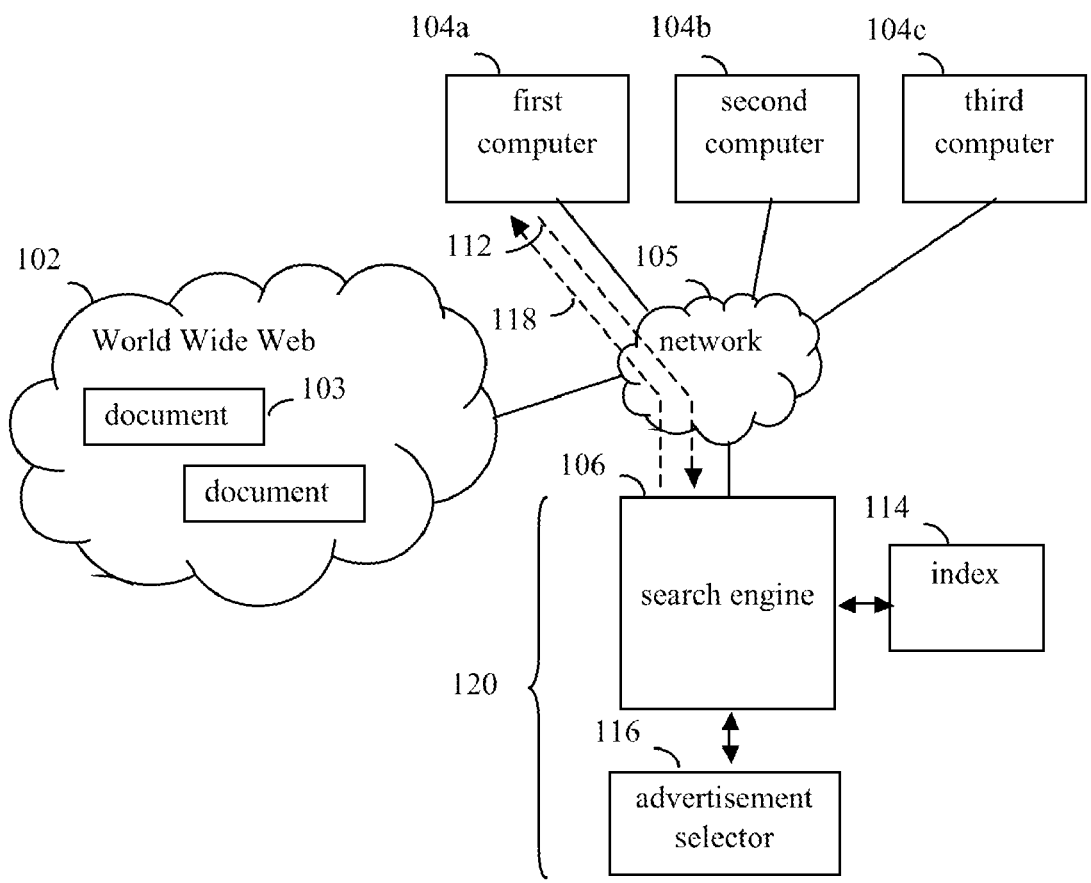
FIG. 1 shows a block diagram of an example search network, according to an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are described in the following sections.

II. Example Embodiments for Identifying Query Topics Unassociated with a Dominant URL and Generating Content for the Identified Topics Embodiments of the present invention identify new trends and enable web sites and other content to be created that satisfy existing and future user and advertiser interests. User satisfaction may be increased by embodiments that guide the creation of content that satisfies the needs of users. In an output bidding context, embodiments of the present invention assist advertisers in obtaining keyword coverage for bid domains that are not already covered by a single URL, which can result in higher advertising investment returns based on the coverage and accuracy of bid terms.

Embodiments may be implemented in a variety of environments, including sponsored search environments. For instance, FIG. 1 shows a search network 100, which is an example environment in which sponsored search may be implemented. As shown in FIG. 1, network 100 includes a search system 120. Search system 120 is configured to provide search results for a received search query 112, and to provide matching advertisements. As shown in FIG. 1, search system 120 includes a search engine 106 and an advertisement selector 116. These and further elements of network 100 are described as follows to illustrate an example search network in which embodiments may be implemented. It is noted that embodiments may also be implemented in other environments.

As shown in FIG. 1, one or more computers 104, such as first-third computers 104a-104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. Computers 104 may each be any type of suitable electronic device, typically having a display and having web browsing capability, such as a desktop computer (e.g., a personal computer, etc.), a mobile computing device (e.g., a personal digital assistant (PDA), a laptop computer, a notebook computer, a tablet computer (e.g., an Apple iPad™), a netbook, etc.), a mobile phone (e.g., a cell phone, a smart phone, etc.), or a mobile email device. In embodiments where network 105 includes the Internet, numerous documents (including a document 103) that form a portion of World Wide Web 102, are available for retrieval by computers 104 through network 105. On the Internet, documents may be identified/located by a uniform resource locator (URL), such as documents.com/documentX, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. For instance, the user may enter query 112 into a search engine entry box displayed by computer 104a (e.g., by a web browser). Search engine 106 receives query 112, and analyzes index 114 to find documents relevant to query 112. For example, search engine 106 may determine a set of documents indexed by index 114 that include terms of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that may be accessible through network 105 include, but are not limited to, Yahoo! Search™ (at yahoo.com), Microsoft Bing™ (at bing.com), Ask.com™ (at ask.com), and Google™ (at google.com).

Figure 2:
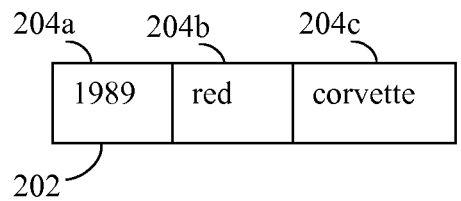
FIG. 2 shows an example query that may be submitted by a user to a search engine.

FIG. 2 shows an example search query 202 that may be submitted by a user of one of computers 104a-104c of FIG. 1 to search engine 106. Query 202 is an example of query 112, and includes one or more terms or features 204, such as first, second, and third features 204a-204c shown in FIG. 2. Any number of features 204 may be present in a query. As shown in FIG. 2, features 204a-204c of query 112 are "1989," "red," and "corvette." Search engine 106 applies these features 204a-204c to index 114 to retrieve a document locator, such as a URL, for one or more indexed documents that match 1989," "red," and "corvette," and may order the list of documents according to a ranking. The list of documents may be displayed to the user in response to query 202.

Furthermore, in a sponsored search environment, one or more advertisements may be selected for display to the user along with the documents displayed to the user in response to query 112. "Sponsored search" refers to a form of Internet advertising/marketing that enables advertisers to increase their visibility in the results page of a search engine query. In sponsored search, an advertiser may pay or provide other consideration for having information, such as a link to a website of the advertiser, appear in a sponsored section of the results webpage for one or more particular queries. The sponsored section is prominently displayed in the results page, to enable the user to easily view and interact with the displayed information of the advertiser. In this manner, an advertiser is enabled to provide advertisements to users that are directly related to their queries, and a search engine owner/operator is enabled to further monetize the search engine.

For example, network 100 may include advertisement selector 116 that is configured to select advertisements related to received queries for display. Advertisement selector 116 may receive query 112 from search engine 106. Advertisement selector 116 may perform a mapping of queries to advertisers/advertisements. Advertisement selector 116 may determine from the mapping whether advertisements are present that correspond to query 112, and if so, to select one or more of the corresponding advertisements to be displayed as sponsored search results for query 112. Advertisement selector 116 may provide an indication of the selected advertisements to search engine 106. Search engine 106 may generate a search results page 118 that is transmitted to first computer 104a to be displayed (e.g., by a browser), and that includes any determined search results and selected advertisements for query 112.

Often, a search, or a group of related searches will cause a search system to retrieve results pointing to a same URL that is dominant within a search space of the related searches (e.g., imdb.com in a movies search space, weather.com in a weather search space, etc.). As such, for some topics, a URL exists that spans an entire or large domain of keywords related to the topics, appearing among the top search results in response to queries for those topics. Utilizing output bidding, advertisers may bid on the URL and gain excellent advertisement coverage a large number of related keywords. However, there are many topics without a dominant URL that comprehensively covers the topics.

Embodiments of the present invention provide approaches that identify topics that are not associated with a dominant URL. As such, content providers and users are enabled by embodiment to generate web sites for the identified topics, and advertisers are enabled to obtain bid coverage for the identified topics.

Figure 3:
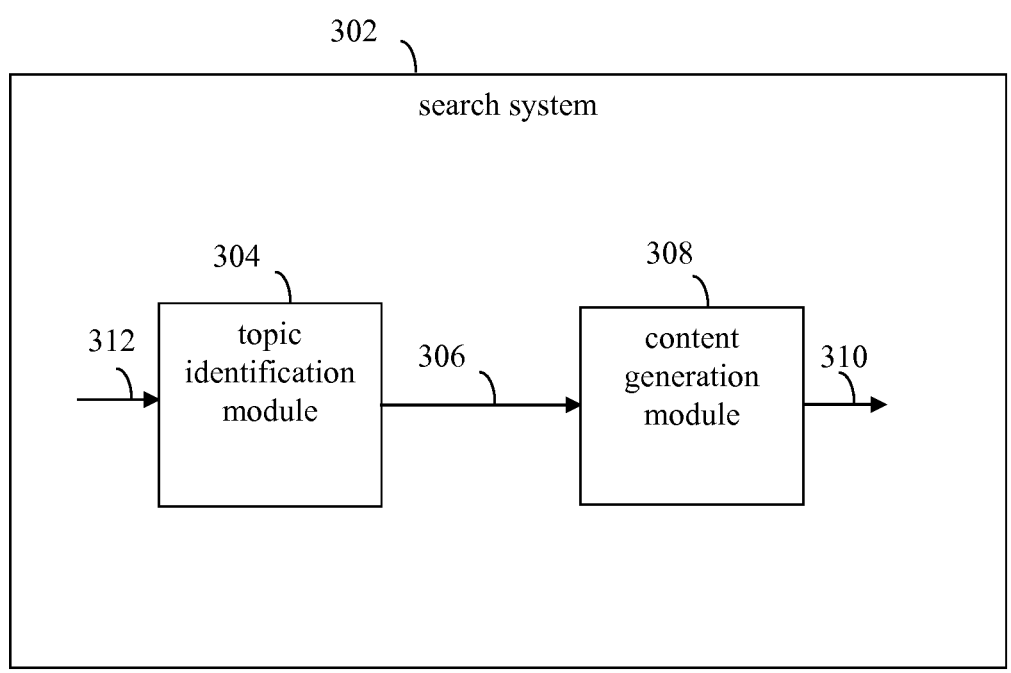
FIG. 3 shows a block diagram of a search system, according to an example embodiment.

For instance, FIG. 3 shows a block diagram of a search system 302, according to an example embodiment. Similarly to search system 120 of FIG. 1, search system 302 may include a search engine (e.g., search engine 106) and an advertisement selector (e.g., advertisement selector 116). Furthermore, as shown in FIG. 3, search system 302 includes a topic identification module 304 and a content generation module 308. Topic identification module 304 receives initial seed keywords 312 from a user (or internally generates seed keywords, as described below). Initial seed keywords 312 includes a plurality of keywords, which may be related or unrelated, and define a topic. Initial seed keywords 312 may be analyzed to determine whether or not a dominant URL exists that is associated with the defined topic. Topic identification module 304 is configured to process initial seed keywords 312 to output topic information 306 for the topic related to initial seed keywords 312. For instance, topic identification module 304 may calculate and output one or more scores for the topic related to initial seed keywords 312 that are included in topic information 306. The scores may be user interest scores, advertiser interest scores, URL dominance scores, or various combinations of scores. Topic information 306 may indicate whether or not a dominant URL is associated with the topic, and if not, whether a web page may be desirable to generate for the topic.

Topic information 306 may be received by content generation module 308. Content generation module 308 is configured to generate a web page 310 associated with the topic defined by the seed keywords. In an embodiment, the topic may be determined to not be associated with a dominant URL (e.g., as indicated by topic information 306). Content generation module 308 may generate titles and/or text snippets based on topic information 306 that may be included in the web page.

Example embodiments for search system 302 are described as follows. For instance, example embodiments for topic identification module 304 and for further techniques for identifying query topics unassociated with a dominant URL are described in further detail in the following section. A subsequent section describes example embodiments for content generation module 308 and for further techniques for generating content associated with identified query topics. It noted that the section/subsection headings provided herein are not intended to be limiting. Embodiments are described throughout this document, and any type of embodiment may be included in any section/subsection.

Figure 4A:
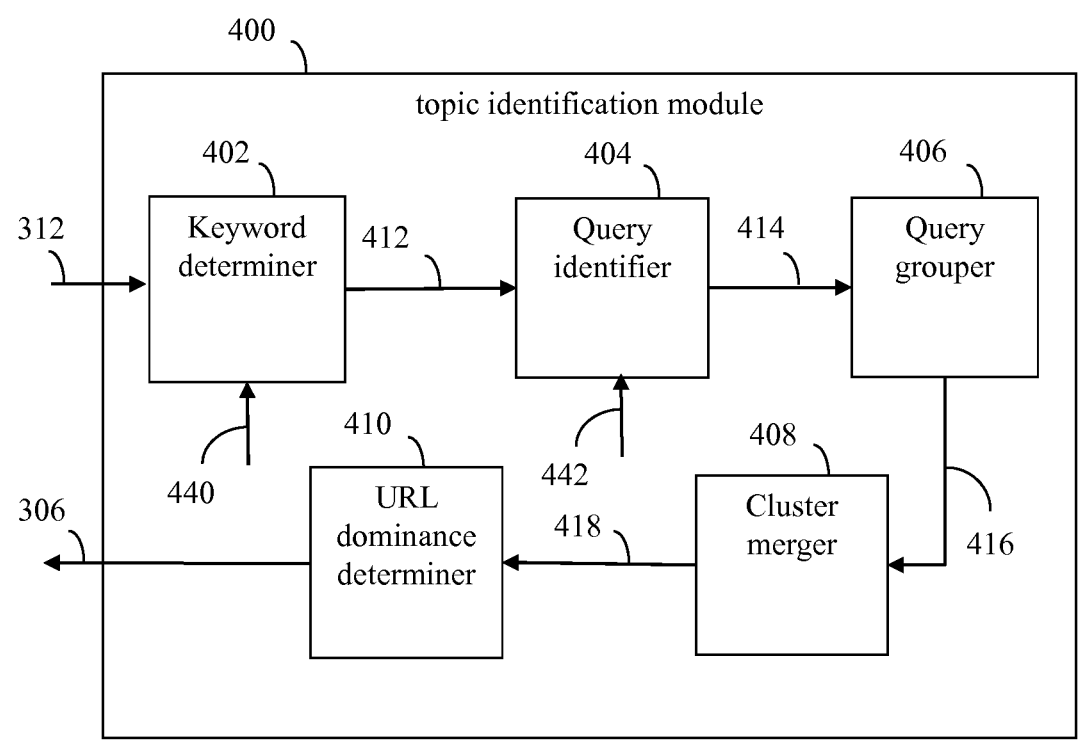
FIG. 4A shows a block diagram of a topic identification module, according to an example embodiment.

III. Example System and Method Embodiments for a Topic Identification Module Topic identification module 304 may be configured in various ways, in embodiments. For instance, FIG. 4A shows a block diagram of a topic identification module 400, according to an example embodiment. Topic identification module 400 is an example of topic identification module 304 of FIG. 3. As shown in FIG. 4A, topic identification module 400 includes a keyword determiner 402, a query identifier 404, a query grouper 406, a cluster merger 408, and a URL dominance determiner 410. These elements of topic identification module 400 are described as follows.

In embodiments, keyword determiner 402 is configured to receive keywords that are analyzed by module 400 for the existence of a dominant URL. In an embodiment, keyword determiner 402 may include a network interface, such as an API (application programming interface), that is configured to receive keywords over a network (e.g., a LAN, WAN, combination of networks, etc.). In embodiments, keyword determiner 402 may receive keywords from a user or may generate keywords. For instance, as shown in FIG. 4A, keyword determiner 402 may receive initial seed keywords 312. Alternatively, as shown in FIG. 4A, keyword determiner 402 may receive a bid query log 440, and may generate keywords based on bid query log 440. In either case, as shown in FIG. 4A, keyword determiner 402 outputs a set of keywords 412 (e.g., a keyword string) that includes the received or generated seed keywords.

For example, keyword determiner 402 may receive initial seed keywords 312 from a user. In one embodiment, keyword determiner 402 receives initial seed keywords 312 from an advertiser that wishes to determine whether keywords included in initial seed keywords 312 are associated with a dominant URL. Alternatively, initial seed keywords 312 may be received from another type of user. In an embodiment where initial seed keywords 312 are received from a user, keyword determiner 402 may output initial seed keywords 312 as set of keywords 412.

Figure 4B:
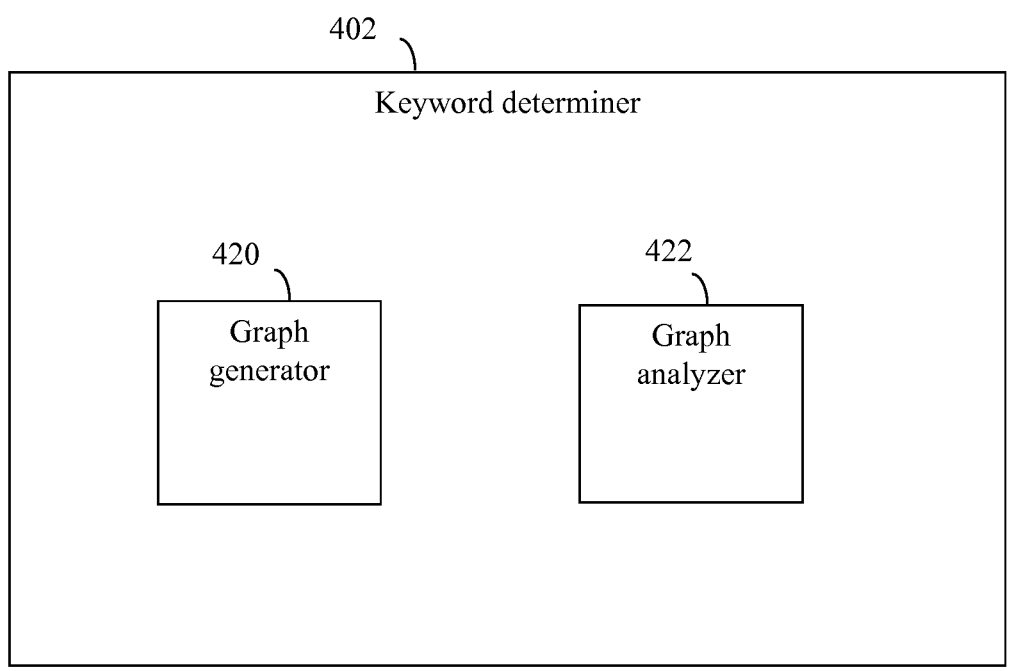
FIG. 4B shows a block diagram of a keyword determiner that is configured to generate and analyze bipartite graphs, according to an example embodiment.

In another embodiment, keyword determiner 402 may be configured to generate set of keywords 412 based an automated process that selects set of keywords 412 from bid query log 440, which is associated with a search engine (e.g., search engine 106). Bid query log 440 is a log of bid queries that are received from advertisers that bid on keywords, such that if the keywords are entered by a user into a search engine as a search query, the advertisements of the advertisers (that provide successful bids) will be displayed in the search results as sponsored search advertisements. For example, bid query log 440 may include a list of advertisements, or advertisement campaigns that include multiple advertisements, provided by advertisers, keywords that the advertisers bid on for each listed advertisement in their bid queries, and the amount/value of each bid (e.g., in dollars/cents). Keyword determiner 402 may determine set of keywords 412 by scanning bid query log 440, and identifying clusters of semantically similar keywords, or keywords associated with one or more advertising campaigns. For instance, FIG. 4B shows a block diagram of keyword determiner 402 configured to generate and analyze bipartite graphs to identify keywords, according to an example embodiment. Keyword determiner 402 may include a graph generator 420 of FIG. 4B to generate a bipartite graph based on bid query log 440 that clusters queries with bids within advertising campaigns. Keyword determiner 402 may include a graph analyzer 422 of FIG. 4B to identify one or more clusters of keywords using the bipartite graph generated by graph generator 420, and may include the keywords of the identified clusters of keywords in set of keywords 412.

Figure 4C:
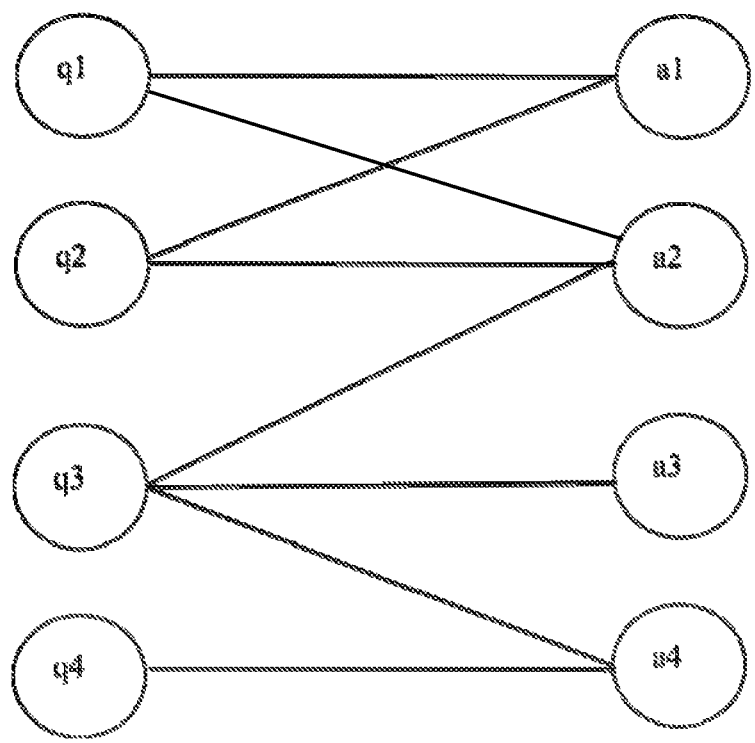
FIG. 4C shows an example bid graph used to identify keyword clusters, according to an embodiment.

For instance, FIG. 4C shows an example bid graph 450 that may be generated by graph generator 420 of keyword determiner 402 from bid query log 440, and may be used by keyword determiner 402 to identify keyword clusters, according to an embodiment. Bid graph 450 is provided for purposes of illustration, and is not intended to be limiting. Bid graph 450 is a bipartite graph between query nodes (e.g., query nodes q1 to q4) and advertisement nodes (e.g., advertisement nodes a1 to a4). Bid graph 450 includes edges connected between query nodes and advertisement nodes. An edge in bid graph 450 indicates that an advertisement "a" at a first end of an edge includes a bid on query (keyword) "q" at a second end of the edge. In embodiments, bid graph 450 may have any number of query nodes, advertisement nodes, and edges, including hundreds, thousands, and even greater numbers of each of the same.

In the example of FIG. 4C, bid graph 450 depicts advertisement a1 having bids on queries q1 and q2, advertisement a2 having bids on queries q1, q2, and q3, advertisement a3 having a bid on query q3, and advertisement a4 having bids on queries q3 and q4 (e.g., as indicated in bid query log 440). To analyze bid graph 450, graph analyzer 422 may determine all i,j cores of bid graph 450, and include the queries of the determined i,j cores in set of keywords 412. Graph analyzer 422 determines the portions of bid graph 450 having at least i query nodes and at least j URL nodes, where the parameters i and j have predetermined values selected for a particular application. The values selected for parameters i and j control the granularity of the clustering. Techniques for analyzing bipartite graphs will be known to persons skilled in the relevant art(s). For example, if i=2 and j=2 then the query clusters in FIG. 4C may be determined by graph analyzer 422 as single query cluster of {q1,q2}, which is a 2,2 core. Queries q3 and q4 are determined to not be included in any 2,2 core. As such, in the example of FIG. 4C, keyword determiner 402 may generate and scan bid graph 450 and select queries q1 and q2 to be included in set of keywords 412. In embodiments, keyword determiner 402 may determine any number of query clusters, and may include any number of queries in set of keywords 412. Furthermore, each query may be included in one or more clusters (e.g., the query "jaguar" may be included in an "animal" query cluster, and in a "car" query cluster").

Furthermore, in an alternative embodiment, graph generator 420 of keyword determiner 402 may generate bid graph 450 for display to a user. The user may analyze bid graph 450 (rather than graph analyzer 422 performing the analysis), and may manually select query clusters of bid graph 450 to be included in set of keywords 412 (e.g., by interacting with a user interface).

Query identifier 404 is optionally present. As shown in FIG. 4A, query identifier 404 receives set of keywords 412. Query identifier 404 is configured to identify queries that are similar to the queries included in set of keywords 412, and to output the identified queries and the keywords of set of keywords 412 as identified queries 414. For example, query identifier 404 may receive a search log 442. Search log 442 may be a search log generated by a search engine, such as search engine 106 of FIG. 1. Search log 442 may include a list of queries that were received by the search engine, may list documents (e.g., by URL or other identifier) that were present in the search results for each listed query, and may optionally indicate which documents were selected by a user for each query. Query identifier 404 may be configured to scan search log 442 to identify queries associated with (e.g., related to) received set of keywords 412.

For instance, in one example, query identifier 404 may set of keyword 412 as including the keyword "knitting." Query identifier 404 may scan search log 442 to identify similar queries to the keyword "knitting." For example, query identifier 404 may identify a first query "where can I find knitting needles," a second query "how much is yarn," and a third query "knitting a sweater" as being similar to the keyword "knitting." Query identifier 404 may identify queries in search log 442 that are similar to keywords in set of keywords 412 in any manner, including by locating the keywords of set of keywords 412 in search log 442, and determining other queries in search log 442 that have similar search results to the located keywords (e.g., have similar documents listed in their search results), and/or in other manner.

Figure 4D:
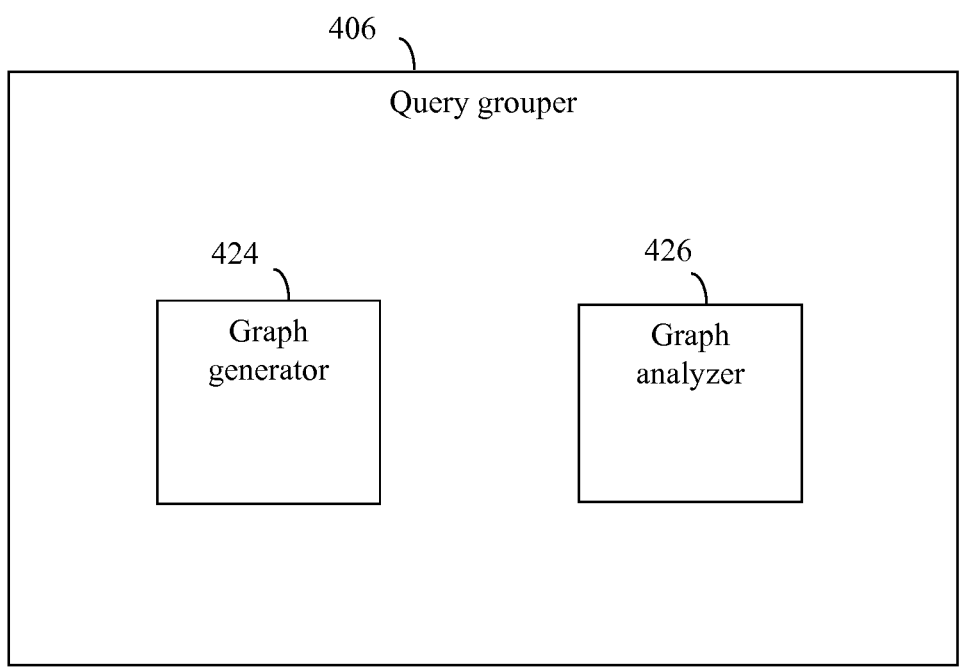
FIG. 4D shows a block diagram of a query grouper that is configured to generate and analyze bipartite graphs, according to an example embodiment.

As shown in FIG. 4A, query grouper 406 receives identified queries 414. Query grouper 406 is configured to group identified queries 414 into query clusters 416 that are associated with similar URLs (e.g., queries having shared or similar URLs). For instance, in an embodiment, query grouper 406 may be configured to group identified queries 414 using a bipartite graph that clusters queries with URLs. For instance, FIG. 4D shows a block diagram of query grouper 406 configured to generate and analyze bipartite graphs to cluster queries, according to an example embodiment. For example, in an embodiment, query grouper 406 may include a graph generator 424 of FIG. 4D that generates a bipartite graph based on search log 442 that clusters queries with URLs. Query grouper 406 may include a graph analyzer 422 of FIG. 4D that identifies one or more clusters of queries using the bipartite graph, and that may include the queries of the identified clusters of queries in query clusters 416.

Figure 4E:
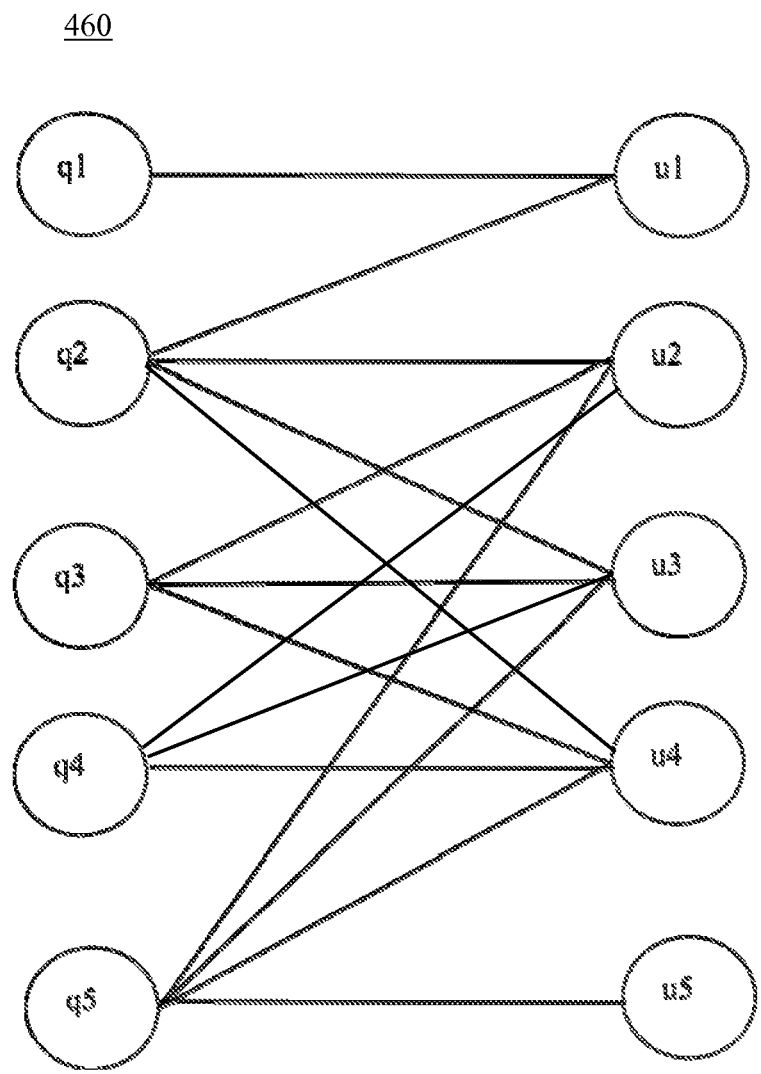
FIG. 4E shows an example impression graph used to cluster queries, according to an embodiment.

For instance, FIG. 4E shows an example impression graph 460 that may be generated by graph generator 424 of query grouper 406 based on the queries included in identified queries 414, and their corresponding search results information in search log 442. Impression graph 460 may be used by query grouper 406 to identify query clusters in identified queries 414 to be included in query clusters 416. Impression graph 460 is provided for purposes of illustration, and is not intended to be limiting. Impression graph 460 is a bipartite graph between query nodes (e.g., query nodes q1 to q5) and URL nodes (e.g., URL nodes u1 to u5). Impression graph 460 includes edges connected between query nodes and URL nodes. An edge in impression graph 460 indicates that a URL "u" at a first end of an edge is within a top-K search results for a query "q" at a second end of the edge. "K" is a predetermined threshold number of search results that may have any suitable value selected for a particular application (e.g., K=5, 10, 15, etc.). In embodiments, impression graph 460 may have any number of query nodes, advertisement nodes, and edges, including hundreds, thousands, and even greater numbers of each of the same.

In the example of FIG. 4E, impression graph 460 depicts URL u1 is within the top-K results of queries q1 and q2, URL u2 is within the top-K results of queries q2, q3, q4, and q5, URL u3 is within the top-K results of queries q2, q3, q4, and q5, URL u4 is within the top-K search results of queries q3, q4, and q5, and URL u5 is within the top-K search results of query q5. Similarly to the description provided above with respect to bid graph 450 (FIG. 4C), the values of parameters i and j control the granularity of the query clustering. For example, if i=3 and j=3 then the query clusters in FIG. 4E may be determined by graph analyzer 426 as a single query cluster of {q2,q3,q4}, which is a 3,3 core, and queries q1 and q5 are not part of any core. As such, in the example of FIG. 4E, query grouper 406 may generate and scan impression graph 460 and select queries q2, q3, and q4 to be included in a query cluster of query clusters 416. In embodiments, query grouper 406 may determine any number of query clusters, and may include any number of queries in query clusters 416. Furthermore, each query may be included in one or more clusters.

Furthermore, in an alternative embodiment, graph generator 424 of query grouper 406 may generate impression graph 460 for display to a user. The user may analyze impression graph 460 (rather than graph analyzer 426 performing the analysis), and may manually select query clusters of impression graph 460 to be included in query clusters 416 (e.g., by interacting with a user interface).

As shown in FIG. 4A, cluster merger 408 receives query clusters 416. Cluster merger 408 is configured to determine an extended seed query string 418 by merging overlapping clusters. For instance, in one embodiment, any clusters of query clusters 416 that include a common query are merged to form a merged cluster. For instance, if a first cluster and a second cluster both include the query q17, the first and second clusters may be merged to form a merged cluster that is included in extended seed query string 418. In another embodiment, cluster merger 408 may merge clusters of query clusters 416 that are associated with URLs that overlap or have similarities.

For example, in query clusters 416, cluster merger 408 may receive a first cluster {q1, q2, q7} associated with a URL of "knittingforbeginners.com," a second cluster {q1, q3, q4} associated with a URL of "knittingninjas.com," and a third cluster {q4, q5, q6} associated with a URL of "breienenjij.n1" (dutch for "knitting and you"). Cluster merger 408 may determine that the URLs overlap (e.g., each include a version of the word "knitting"), and may merge these clusters of query clusters 416 to generate extended seed query string 418 to include the merged cluster {q1, q2, q3, q4, q5, q6, q7} of queries.

As shown in FIG. 4A, URL dominance determiner 410 receives extended seed query string 418. URL dominance determiner 410 is configured to determine whether a dominant URL is associated with extended seed query string 418, and to output topic information 306 associated with the determination. For instance, in an embodiment, URL dominance determiner 410 may determine one or more scores based on extended seed query string 418 associated with a topic defined by extended seed query string 418. For instance, URL dominance determiner 410 may calculate a score associated with a level of user interest with respect to topics associated with extended seed query string 418, a score associated with a level of advertiser interest with respect to topics associated with extended seed query string 418, and/or a score associated with coverage of one or more URLs with respect to topics associated with extended seed query string 418. The one or more scores may indicate whether a dominant URL is associated with the queries/query clusters of extended seed query string 418, and/or whether user and/or advertiser interest in such a dominant URL exists. Examples of calculations of various scores that may be included in topic information 306 are described as follows with respect to FIGS. 6-8.

URL dominance determiner 410 may compare the scores with various threshold values in order to determine whether a topic is associated with a dominant URL. The threshold values may identify a range of values that denote a dominant URL (e.g., scores between 0.8 and 1.0), a range of values that denote a lack of dominant URL e.g., scores between 0.0 and 0.8), and so on.

Figure 5:
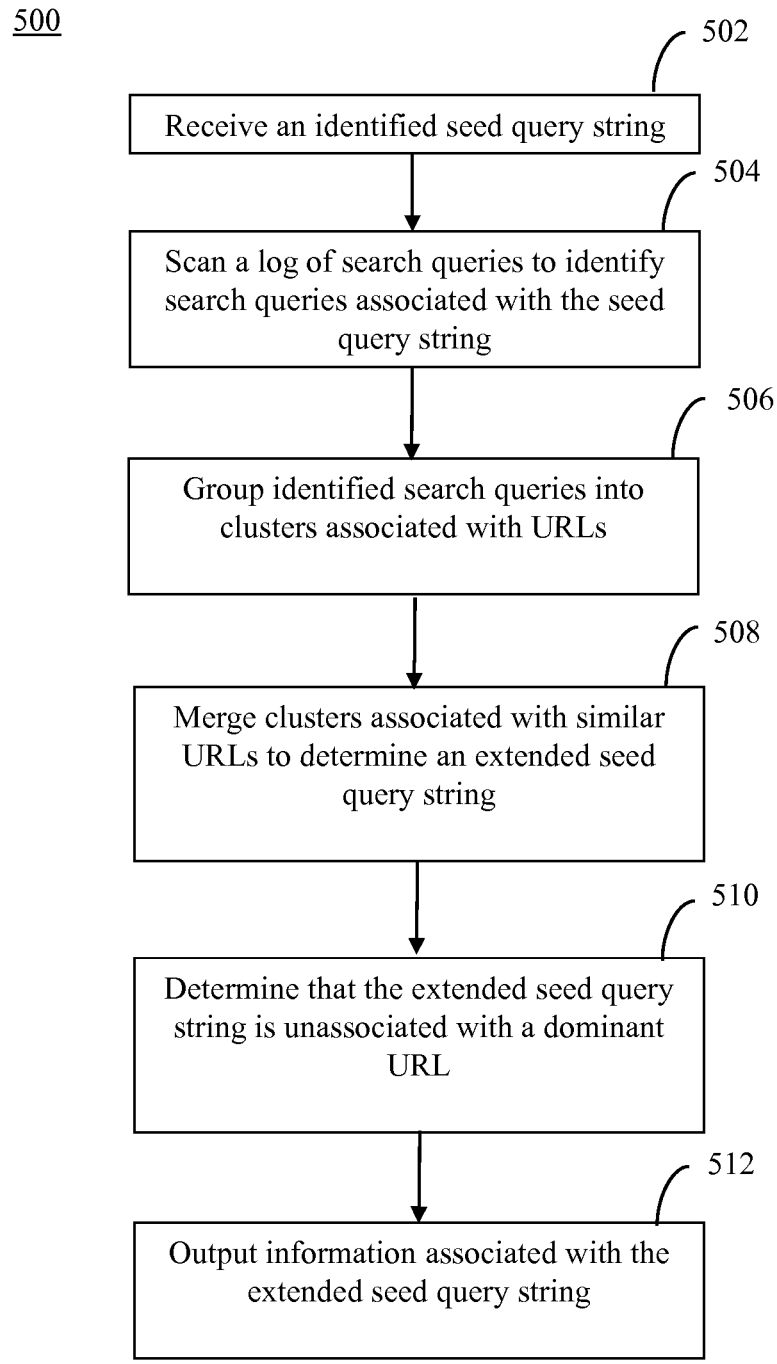
FIG. 5 shows a flowchart for identifying a topic unassociated with a dominant URL, according to an example embodiment.

As such, topic identification module 400 of FIG. 4A may receive initial seed keywords 312 or internally generate keywords 312, and may generate topic information 306 associated with a determination of whether a topic defined by keywords 312 is associated with a dominant URL. For instance, topic identification module 400 may operate according to FIG. 5. FIG. 5 shows a flowchart 500 for identifying one or more topics unassociated with a dominant URL, according to an example embodiment. Flowchart 500 is described as follows with respect to topic identification module 500 for illustrative purposes. Further structural and operational embodiments will be apparent to persons skilled in the relevant art(s) based on the following description of flowchart 500.

Flowchart 500 begins with step 502. In step 502, a seed query or seed keyword is received. For example, as shown in FIG. 4A, keyword determiner 402 receives initial seed keywords 312 from a user, which are output as set of keywords 412. Alternatively, as described above, keyword determiner 402 may scan a bid log to determine keywords associated with advertisements, to generate set of keywords 412.

In step 504, a log of search queries is scanned to identify search queries associated with the received seed query. For instance, in an embodiment, as described above, query identifier 404 scans search log 442 for determine identified queries 414 that are similar to received initial seed keywords 312.

In step 506, identified search queries are grouped into clusters associated with URLs. For example, in an embodiment, as described above, query grouper 406 groups search identified queries 414 into query clusters 416 using a bipartite graph (e.g., impression graph 460 of FIG. 4E).

In step 508, the clustered search queries 416 are merged based on similarities of their associated URLs to determine an extended seed query string. For instance, in an embodiment, as described above, query merger 408 generates extended seed query string 418 that includes merged clusters having overlapping queries and/or that are associated with URLs that include similar or overlapping words.

In step 510, information is generated to determine if a topic related to an extended seed query string is associated with a dominant URL. For example, in an embodiment, as described above, URL dominance determiner 410 may calculate one or more scores associated with user interest in a topic, advertiser interest in a topic, and/or URL dominance for a topic. URL dominance determiner 410 may compares the calculated scores to various threshold values or metrics to determine whether a dominant URL is associated with extended seed query string 418.

In step 512, the generated information is output. For example, in an embodiment, as described above, URL dominance determiner 410 outputs topic information 306 associated with a determination whether or not a topic is unassociated with a dominant URL.

Figure 6:
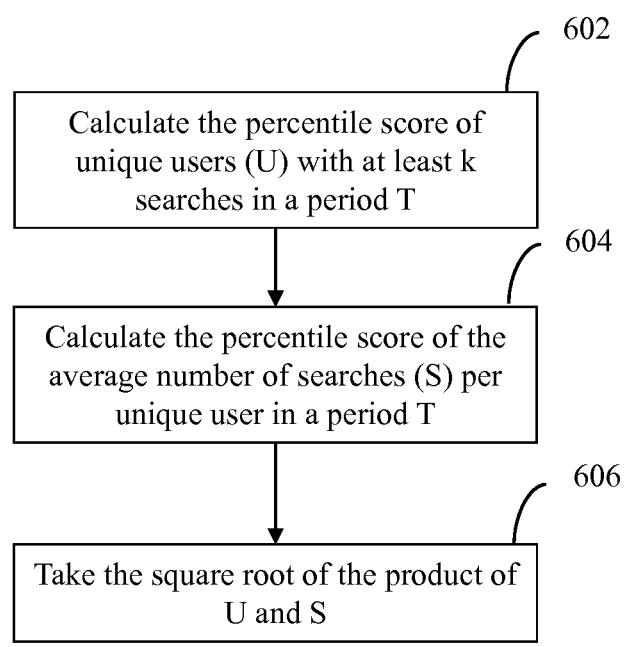
FIG. 6 shows a flowchart for determining a user interest score, according to an example embodiment.
Figure 7:
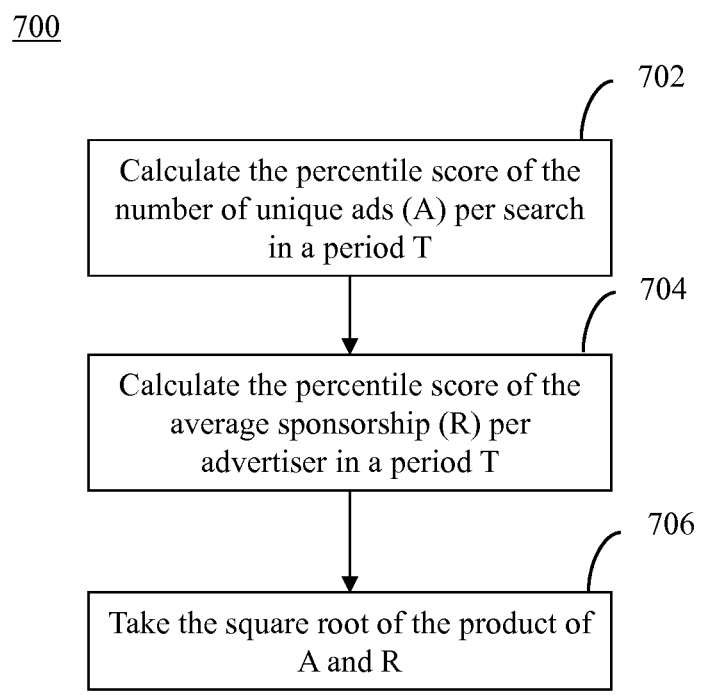
FIG. 7 shows a flowchart for determining an advertiser interest score, according to an example embodiment.
Figure 8:
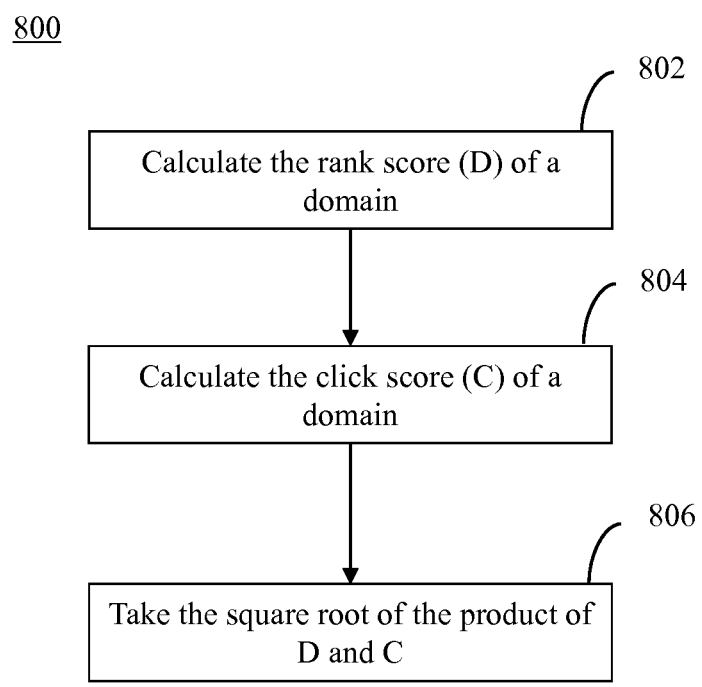
FIG. 8 shows a flowchart for determining a URL dominance score, according to an example embodiment.

As described with respect to step 510 of FIG. 5, URL dominance determiner 410 may calculate various scores to determine whether a topic is associated with a dominant URL. FIGS. 6-8 show flowcharts for determining example scores, according to embodiments. In calculating scores, URL dominance determiner 410 may, in embodiments, collect data for all queries associated with extended seed query string 418 in order to calculate scores or metrics for the cluster. The scores for each extended keyword string are compared with one another to determine percentile scores across all clusters in a search log. For example, clusters may be assigned scores between 0 and 1, with scores near 0 indicating relatively lower interest and/or a lack of a dominant URL, and scores near 1 indicating relatively higher interest and/or an existence of a dominant URL.

Figure 9A:
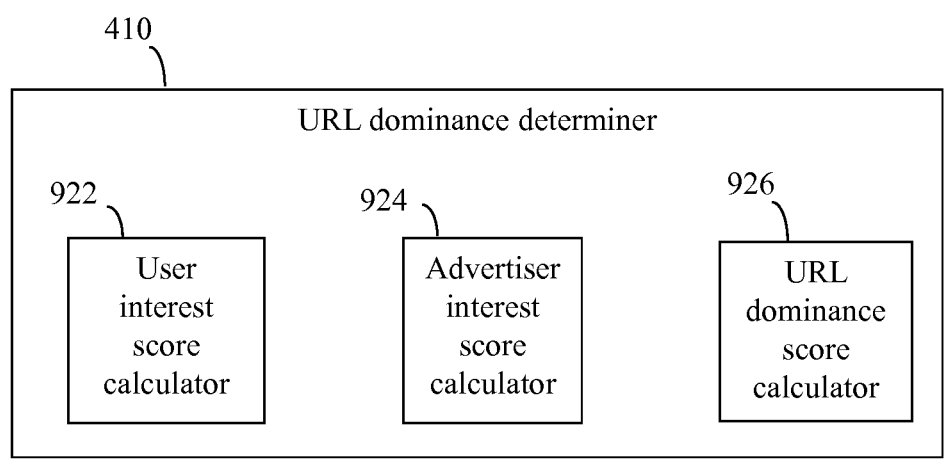
FIG. 9A shows a block diagram of a URL dominance determiner, according to an example embodiment.

FIGS. 6-8 are described with respect to FIG. 9A. FIG. 9A shows a block diagram of URL dominance determiner 410, according to an example embodiment. As shown in FIG. 9A, URL dominance determiner 410 includes a user interest score calculator 922, an advertiser interest score calculator 924, and a URL dominance score calculator 926. User interest score calculator 922 is configured to calculate a score associated with a user interest in one or more identified topics. Advertiser interest score calculator 924 is configured to calculate a score associated with advertiser interest in the identified one or more topics. URL dominance score calculator 926 is configured to calculate a score associated with dominance of a single URL for the identified one or more topics. One or more of user interest score calculator 922, advertiser interest score calculator 924, and URL dominance score calculator 926 may be present, in embodiments, and may be configured to operate according to FIGS. 6-8, respectively.

FIG. 6 shows a flowchart 600 for determining a user interest score, according to an example embodiment. In an embodiment, flowchart 600 may be performed by user interest score calculator 922 of FIG. 9A. In step 602 of flowchart 600, a percentile score of unique users (U) with at least k searches in a time period T is calculated. For instance, user interest score calculator 922 may analyze search log 442 (FIG. 4A) to determine a number of users that performed a predetermined number of "k" searches within a predetermined time period "T" using queries of the cluster of extended seed query string 418, and may divide the determined number of users by the total number of users that performed searches. Unique users may be identified in any manner, including by cookie information associated with users, login/account information associated with users, etc., which may be tracked/indicated in search log 442. In step 604, a percentile score of an average number of searches (S) per unique user in time period T is calculated. For instance, user interest score calculator 922 may analyze search log 442 to determine an average number of searches performed using queries of the cluster of extended seed query string 418 for unique users in the predetermined time period "T." In step 606, a square root of the product of S and T is taken. For instance, user interest score calculator 922 may multiply the determined percentile of users (determined in step 602) by the determined average number of searches (determined in step 604), and may take the square root of the result, to determine a user interest score.

Thus, for a given topic associated with the query cluster of extended seed query string 418, a metric or score associated with user interest in a topic is calculated. Values for "k" searches and time period "T" may be predetermined in any manner for a particular application. For instance, an example value for "k" may be 5 searches, and an example value for time period "T" may be 30 days (e.g., a month). In one example, percentile scores of U=0.8 (e.g., many users) and S=0.6 (e.g., few searches per user) may be determined in steps 602 and 604, such that a user interest score of 0.69 is determined in step 606, indicating a relatively high level of user interest. Values of the user interest score that are less than 0.5 may indicate a relatively low level of user interest, while values of the user interest score that are greater than 0.5 may indicate a relatively high level of user interest (1.0 indicates greatest user interest, 0.0 indicates no user interest). In other embodiments, a user interest score may be determined in other ways, using the same information or different information.

FIG. 7 shows a flowchart 700 for determining an advertiser interest score, according to an example embodiment. In an embodiment, flowchart 700 may be performed by advertiser interest score calculator 924 of FIG. 9A. In step 702 of flowchart 700, a percentile score of a number of unique ads (A) per search in a time period T is calculated. For instance, advertiser interest score calculator 924 may analyze search log 442 or bid query log 440 (FIG. 4A) to determine a number of unique advertisements that were displayed within a predetermined time period "T" in response to the queries of the cluster of extended seed query string 418 (as sponsored search results), and may divide the determined number by the total number of times the queries of the cluster of extended seed query string 418 were submitted during time period "T." In step 704, a percentile score of an average sponsorship (R) per advertiser in a time period T is calculated. For instance, advertiser interest score calculator 924 may analyze search log 442 or bid query log 440 to determine the average of the spending on advertisements per advertiser over time period "T" on the advertisements determined in step 702 to be displayed within time period "T." In step 706, a square root of the product of A and R is taken. For instance, advertiser interest score calculator 924 may multiply the determined percentile score of number of unique ads (determined in step 702) by the determined percentile score of average sponsorship per advertiser (determined in step 604), and may take the square root of the result, to determine an advertiser interest score.

Thus, for a given topic associated with the query cluster of extended seed query string 418, a metric or score associated with advertiser interest in a topic is calculated. In one example, percentiles scores of A=0.5 (e.g., few advertisers) and R=0.99 (e.g., high sponsorship values) may be determined for steps 702 and 704, such that an advertiser interest score of 0.70 is determined step 706, indicating a relatively high level of advertiser interest. Values of the advertiser interest score that are less than 0.5 may indicate a relatively low level of advertiser interest, while values of the advertiser interest score that are greater than 0.5 may indicate a relatively high level of advertiser interest (1.0 indicates greatest advertiser interest, 0.0 indicates no advertiser interest). In other embodiments, an advertiser interest score may be determined in other ways, using the same information or different information.

FIG. 8 shows a flowchart 800 for determining a URL dominance score, or domain importance score, according to an example embodiment. In an embodiment, flowchart 800 may be performed by URL dominance score calculator 926 of FIG. 9A. In step 802 of flowchart 800, a rank score (D) of a domain or URL is calculated. In an embodiment, URL dominance score calculator 926 may analyze search log 442, and calculate the score as the number of searches for each domain that is displayed in the top N search results for the queries of the cluster of extended seed query string 418. In step 804, a click score (C) of a domain is calculated. In an embodiment, URL dominance score calculator 926 may analyze search log 442, and calculate the click score C as a total number of clicks for a domain in the search results the queries of the cluster of extended seed query string 418, or as the total number of clicks on a search results page for all searches for the queries of the cluster of extended seed query string 418. In step 806, a square root of the product of D and C is taken. For instance, URL dominance score calculator 926 may multiply the determined rank score (determined in step 802) by the determined click score (determined in step 804), and may take the square root of the result, to determine a URL dominance score.

Thus, for a given topic associated with the query cluster of extended seed query string 418, a metric or score associated with a dominance of a single URL is calculated. In one example, percentile scores of D=0.9 (e.g., high rank score) and C=0.6 (e.g., average click score) may be determined for steps 802 and 804, and a domain importance score of 0.73 may be determined for step 806, indicating a relatively high level of URL dominance. Values of the URL dominance score that are less than 0.5 may indicate a relatively low level of URL dominance, while values of the URL dominance score that are greater than 0.5 may indicate a relatively high level of URL dominance (1.0 indicates greatest URL dominance, 0.0 indicates no URL dominance). In other embodiments, a URL dominance importance score may be determined in other ways, using the same information or different information.

Thus, in embodiments, URL dominance determiner 410 may calculate one or more scores to determine user interest in a topic (associated with a cluster of queries), advertiser interest in the topic, and/or URL dominance for the topic, and outputs topic information 306. The one or more scores may be included in topic information 306. Additionally and/or alternatively, topic information 306 may provide an indication of whether or not a dominant URL exists for a topic associated with the query cluster of extended seed query string 418 (e.g., a dominant URL may be determined to not exist for the topic if the URL dominance importance score is relatively low), and if not, may provide an indication of whether generating content associated with the topic is desirable (e.g., may be desirable if one or both of the user interest and advertiser interest scores are relatively high) Topic information 306 may be received by content generation module 308, and content generation module 308 may generate content, such as web pages, for a topic when topic information 306 indicates the topic is unassociated with a dominant URL and there is user and/or advertiser interest in the topic. The following section describes examples of content generation for topics.

IV. Example System and Method Embodiments for a Content Generation Module

As described above, in embodiments, information may be provided to content generation module 308 indicating whether a topic defined by a query cluster is associated with a dominant URL. Content generation module 308 may be configured to generate web page 310 associated with the topic. For instance, if a dominant URL is determined to not be associated with the topic, generating a web page at a new URL for the topic may fill the void due to the lack of dominant URL. For instance, content generation module 308 may be configured to generate titles and/or textual snippets in order to create a web page for the topic. That is, for a given set of queries determined to be unassociated with a dominant URL, content generation module 308 may perform various techniques to generate content for a web page corresponding to the topic defined by the set of queries.

Figure 9B:
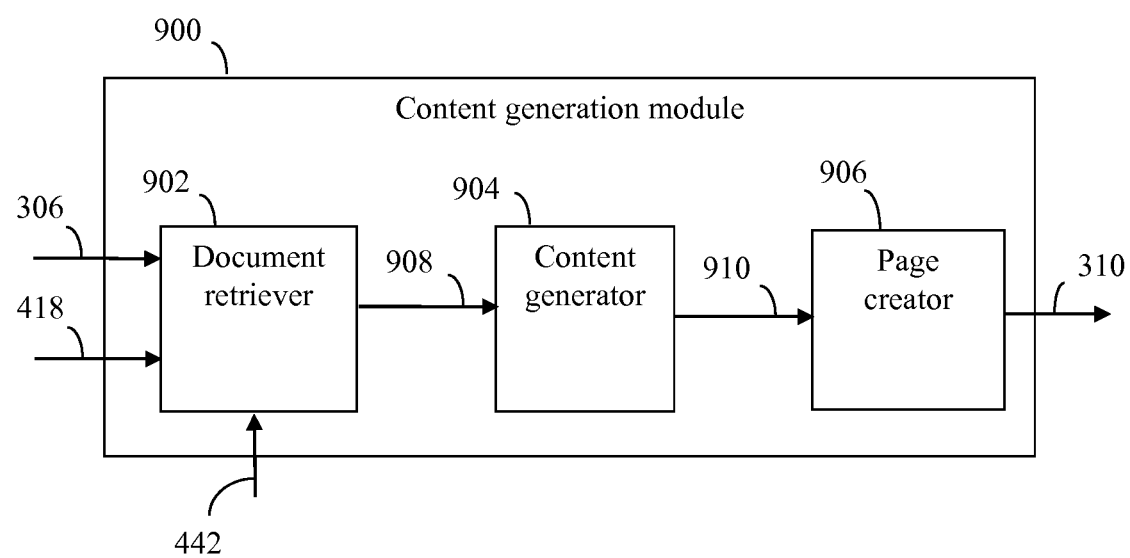
FIG. 9B shows a block diagram of a content generation module, according to an example embodiment.

Example embodiments for content generation module 308 and for further techniques for generating content for topics are described as follows. Content generation module 308 may be configured in various ways, in embodiments. For instance, FIG. 9B shows a block diagram of a content generation module 900, according to an example embodiment. Content generation module 900 is an example of content generation module 308 of FIG. 3. As shown in FIG. 9B, content generation module 900 includes a document retriever 902, a content generator 904, and a page creator 906. These elements of content generation module 900 are described as follows.

As shown in FIG. 9B, document retriever 902 receives topic information 306 from topic identification module 304. As shown in FIG. 9B, document retriever 902 receives extended seed query string 418, and receives topic information 306 for a topic defined by extended seed query string 418. Topic information 306 may indicate whether the topic is unassociated with a dominant URL. Furthermore, document retriever 902 receives search log 442. As described above, search log 442 may include a list of queries that were received by the search engine, may list documents (e.g., by URL or other identifier) that were present in the search results for each listed query, and may optionally indicate which documents were selected by a user for each query. In an embodiment, document retriever 902 may include a network interface, such as an API (application programming interface), configured to receive topic information 306, extended seed query string 418, and/or search log 442 from over a network (e.g., a LAN, WAN, combination of networks, etc.).

In an embodiment, if topic information 306 indicates that a topic defined by extended seed query string 418 is unassociated with a dominant URL, document retriever 902 (and the remainder of content generation module 900) may be enabled to proceed further with content generation. If topic information 306 indicates that a topic defined by extended seed query string 418 is already associated with a dominant URL, document retriever 902 (and the remainder of content generation module 900) may be disabled.

Document retriever 902 may scan search log 442 for documents associated with the queries of extended seed query string 418. For example, document retriever 902 may retrieve documents appearing in the search results for the queries by URL or other identifier. In one embodiment, document retriever 902 may scan search log 442 to identify URLs for each query that were clicked or selected more than a predetermined number of times, and may retrieve the documents identified by the URLs. As shown in FIG. 9B, document retriever 902 outputs retrieved documents 908, which includes the retrieved documents.

Content generator 904 receives retrieved documents 908. Content generator 904 is configured to generate content based on retrieved documents 908 that is representative of the topic defined by extended seed query string 418. Content generator 904 may generate various types of content using a variety of techniques. For instance, in an embodiment, content generator 904 may generate a title for a web page associated with the topic by analyzing retrieved documents 908. In an embodiment, content generator 904 may generate textual snippets and/or other body text for a web page associated with the topic based on the contents of retrieved documents 908.

For instance, in an embodiment, content generator 904 may merge the content of all the documents included in retrieved documents 908 into a single document, referred to as a compilation document. Content generator 904 may optionally weight the merged content in the compilation document based on the click rate of the URLs (in search log 442) corresponding to the documents of retrieved documents 908. Thus, when generating the compilation document, content generator 904 may add the content of a first document corresponding to a first URL ten times more than the content of a second document corresponding to a second URL if the first URL is determined to be clicked ten times more than the second URL. In other embodiments, content generator 904 may weight the merged content in the compilation document in additional and/or alternative ways.

Content generator 904 may be configured to summarize the compilation document using n-grams and TF-IDF scores. For instance, an n-gram w of the document d is a phrase consisting of n consecutive words. For instance, a "unigram" is a single word in a document, a "bi-gram" is a pair of words of the document, a "tri-gram" is a triplet of words in the document, etc. A TD-IDF score may be generated for each n-gram w in the compilation document. The TD-IDF score for an n-gram w may be generated based on the term frequency of the n-gram in the compilation document, and on the inverse document frequency of the n-gram across all URLs in search log 442. A TF-IDF score for an n-gram may be calculated according to Equation 1 shown below:

$$TF\text{-}IDF = TF_{w,d} \times IDF_w,\qquad \text{Equation 1}$$

where $TF_{w,d}$ is the term frequency of an n-gram w in compilation document d, and $IDF_w$ is the inverse document frequency of the n-gram w across all URLs in query log 442.

That is, $TF_{w,d}$ is calculated as the number of times the n-gram w is contained within the document d, and $IDF_w$ is calculated as the total number of documents (by URL) divided by the number of documents that contain the n-gram.

Thus, according to Equation 1, comparatively higher TF-IDF scores for n-grams indicate the n-grams may be included in text snippets and/or a title for a new web page to be generated for a topic. Content generator 904 may select n-grams of the compilation document having TF-IDF scores higher than a predetermined threshold, may select n-grams of the of the compilation document having TF-IDF scores in a top percentile (e.g., top 10% or other percentile), and/or may select n-grams of the of the compilation document in other ways to be used to generate content. As shown in FIG. 9B, content generator 904 outputs selected content 910, which includes the selected n-grams (e.g., terms or phrases) to be utilized in creating a new web page for a topic.

Page creator 906 receives the selected content 910 associated with high TF-IDF scores. In embodiments, page creator 906 creates web page 310 using the received selected content 910. For example, page creator 906 may select a title for the web page 310 from selected content 910. For instance, page creator 906 may select n-grams of selected content 910 that have the highest TF-IDF scores (e.g., top 10% of TD-IDF scores of n-grams of selected content 910), that originated in titles from other web pages, and/or may create a title in other ways. Furthermore, page creator 906 may select text snippets from selected content 910 for the web page 310 using the entirety of, or selected portions of selected content 910.

Figure 10:
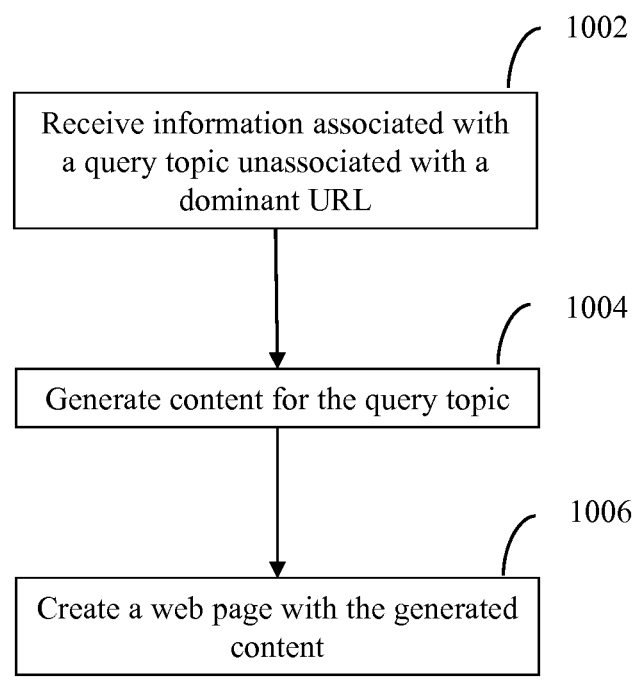
FIG. 10 shows a flowchart for generating content for a topic unassociated with a dominant URL, according to an example embodiment.

As such, content generation module 900 of FIG. 9B may receive information related to a topic unassociated with a dominant URL, and may generate content for a web page related to the topic. For instance, content generation module 900 may operate according to FIG. 10. FIG. 10 shows a flowchart 1000 for generating content for a topic unassociated with a dominant URL, according to an example embodiment. Flowchart 1000 is described as follows with respect to content generation module 1000 for illustrative purposes. Further structural and operational embodiments will be apparent to persons skilled in the relevant art(s) based on the following description of flowchart 1000.

Flowchart 1000 begins with step 1002. In step 1002, information associated with a query topic unassociated with a dominant URL is received. For example, in one embodiment, document retriever 902 scans a query log and identifies documents/URLs for queries of a query cluster that were clicked or selected more than a predetermined number of times.

In step 1004, content for the query topic is generated. For example, in one embodiment, content generator 904 may generate a single compilation document that contains all of the content for URLs associated with a query cluster, and may use the document to identify content (e.g., terms and phrases) that frequently occur in the compilation document but do not frequently occur in a corpus of documents associated with a search log.

In step 1006, a web page that includes the generated content is created. For example, in one embodiment, page creator 906 generates web page 910 that includes terms having high TF-IDF scores in the title and in the body text of web page 910.

Figure 11:
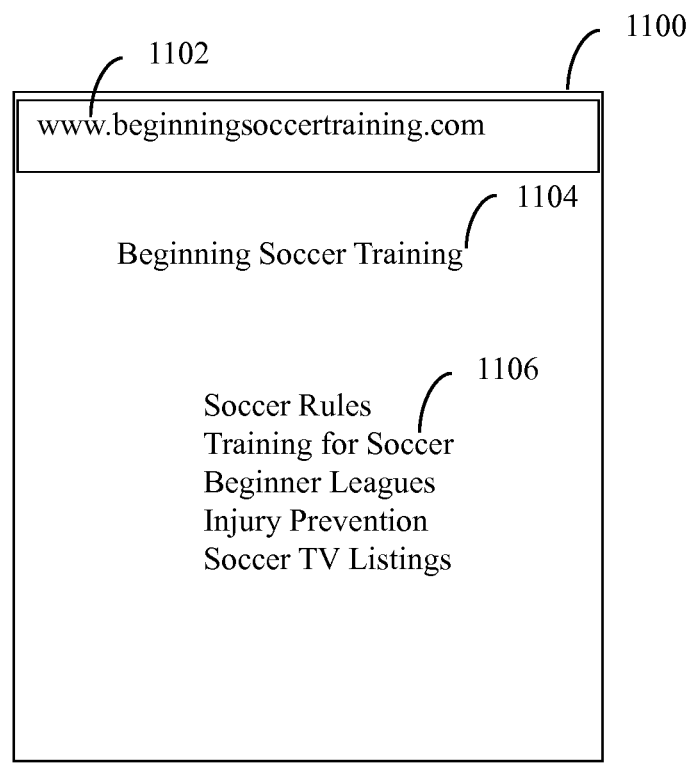
FIG. 11 shows a web page that includes generated content for a topic unassociated with a dominant URL, according to an example embodiment.

FIG. 11 shows a web page 1100 having a title and text snippets based on terms having high TF-IDF scores. Web page 1100 includes a URL 1102, a title 1104, and text snippets 1106. Web page 1100 depicts an example created web page 910 for a topic of "beginner soccer" that may be defined by a cluster of keywords/queries related to beginner soccer. Using the techniques described herein, page creator 906 may have selected title 1104 of "Beginner Soccer Training" from selected content 910, and may have selected text snippet 1106 of "soccer rules," "training for soccer," "beginner leagues," "injury prevention," and "soccer tv listings" from selected content 910. That is, in this example, page creator 906 may have determined the n-grams "beginning soccer" and "soccer training" had the highest TF-IDF scores of selected content 910, and may have generated title 1104 of "Beginning Soccer Training" as a combination of the two. Furthermore, page creator 906 may have determined the n-grams "soccer rules," "training," "beginner," "leagues," "injury prevention," and "TV listings" as being the remainder of selected content 910, to have the highest TF-IDF scores in selected content 910 after "beginning soccer" and "soccer training," and/or to have other attribute, and included them in text snippet 1106. Following this example, page creator 906 may include title 1104 and text snippet 1106 in web page 1100 output by page creator 906.

Of course, page creator 906 may create web page 1110 having other content, such as other text snippets related to the topic, images, videos, and other searchable media related to the topic, and so on. Furthermore, page creator 906 may modify existing web pages with generated content 910 received from content generator 906. For example, after additional queries are received, content generator 906 may generate a modified title, such as "amateur soccer training," for web page 1110 based on the techniques described herein.

As such, in embodiments, a compilation document is generated from documents/URLs selected based on a cluster of queries. Content for a new web page is generated based n-grams (words and/or phrases) in the compilation document having high relevance to a topic associated with the cluster of queries. The new web page may be part of a new web site, may be a new web page for an existing web site, may be a modified web page in an existing web site, and so on. Thus, a publisher or other user may create a web site that includes content generated or suggested by the embodiments described herein. The new web page may be used to display advertisements, which may be bid upon, and/or in other ways to generate revenue. Embodiments may be useful to publishers who may use generate web pages that attract users with interests related to the topic, and thereby may attract advertisers due to the web pages containing content with both high user and advertiser interest. Publishers desire high appeal for advertisements that appear on their web properties. They want the ads to be viewed by the users as helpful information, not intrusions. For example, a bird watching blog wants to have appropriate and targeted ads appear next to the blog as the topics change from day-to-day. Embodiments enable web pages to be generated that fulfill unmet content needs, and thereby enable targeted advertisements to be displayed in association with that content. In an output-bidding scheme, advertisers may be enabled to bid on a relatively small set of URLs and expect wide coverage. Bidding for individual keywords can do this, but specific target keywords can change based on blog content, and it takes time and effort to continuously change the keywords used for ad bidding. Embodiments overcome these deficiencies.

V. Example Computer Implementations

Search engine 106, advertisement selector 116, search system 120, search system 302, topic identification module 304, content generation module 308, topic identification module 400, keyword determiner 402, query identifier 404, query grouper 406, cluster merger 408, URL dominance determiner 410, graph generator 420, graph analyzer 422, graph generator 424, graph analyzer 426, content generation module 900, document retriever 902, content generator 904, page creator 906, user interest score calculator 922, advertiser interest score calculator 924, and URL dominance score calculator 926 may be implemented in hardware, software, firmware, or any combination thereof. For example, search engine 106, advertisement selector 116, search system 120, search system 302, topic identification module 304, content generation module 308, topic identification module 400, keyword determiner 402, query identifier 404, query grouper 406, cluster merger 408, URL dominance determiner 410, graph generator 420, graph analyzer 422, graph generator 424, graph analyzer 426, content generation module 900, document retriever 902, content generator 904, page creator 906, user interest score calculator 922, advertiser interest score calculator 924, and/or URL dominance score calculator 926 may be implemented as computer program code configured to be executed in one or more processors. Alternatively, search engine 106, advertisement selector 116, search system 120, search system 302, topic identification module 304, content generation module 308, topic identification module 400, keyword determiner 402, query identifier 404, query grouper 406, cluster merger 408, URL dominance determiner 410, graph generator 420, graph analyzer 422, graph generator 424, graph analyzer 426, content generation module 900, document retriever 902, content generator 904, page creator 906, user interest score calculator 922, advertiser interest score calculator 924, and/or URL dominance score calculator 926 may be implemented as hardware logic/electrical circuitry.

Figure 12:
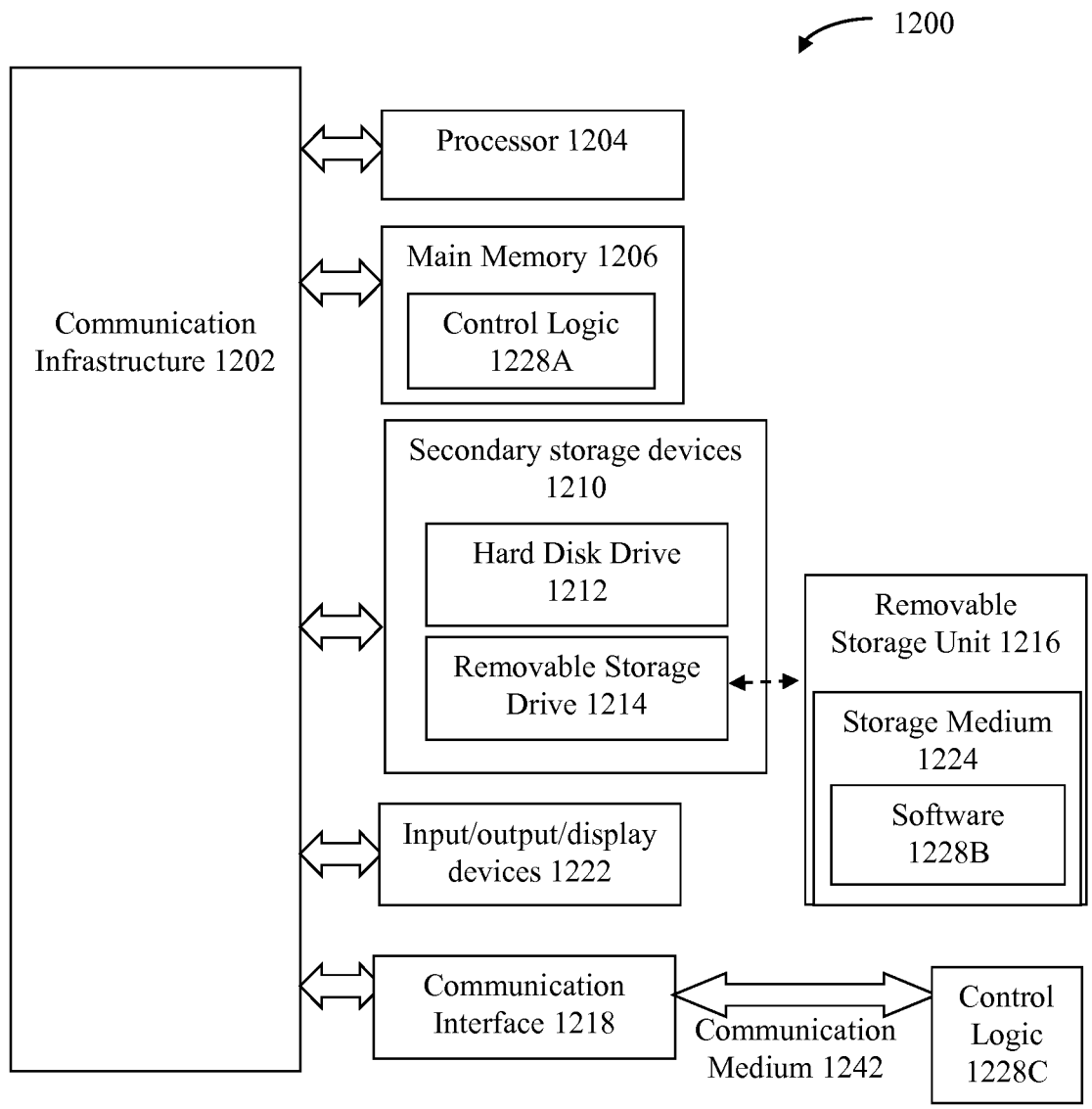
FIG. 12 is a block diagram of a computer in which embodiments may be implemented.

The embodiments described herein, including systems, methods/processes, and/or apparatuses, may be implemented using well known servers/computers, such as a computer 1200 shown in FIG. 12. For example, computers 104, search engine 106, advertisement selector 116, search system 120, and/or search system 302 can be implemented using one or more computers 1200.

Computer 1200 can be any commercially available and well known computer capable of performing the functions described herein, such as computers available from International Business Machines, Apple, Sun, HP, Dell, Cray, etc. Computer 1200 may be any type of computer, including a desktop computer, a server, etc.

Computer 1200 includes one or more processors (also called central processing units, or CPUs), such as a processor 1204. Processor 1204 is connected to a communication infrastructure 1202, such as a communication bus. In some embodiments, processor 1204 can simultaneously operate multiple computing threads.

Computer 1200 also includes a primary or main memory 1206, such as random access memory (RAM). Main memory 1206 has stored therein control logic 1228A (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1900 may include an industry standard interface, such a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1224 having stored therein computer software 1228B (control logic) and/or data. Removable storage unit 1216 represents a floppy disk, magnetic tape, compact disk, DVD, optical storage disk, or any other computer data storage device. Removable storage drive 1214 reads from and/or writes to removable storage unit 1216 in a well known manner.

Computer 1200 also includes input/output/display devices 1222, such as monitors, keyboards, pointing devices, etc.

Computer 1200 further includes a communication or network interface 1218.

Communication interface 1218 enables the computer 1200 to communicate with remote devices. For example, communication interface 1218 allows computer 1200 to communicate over communication networks or mediums 1242 (representing a form of a computer useable or readable medium), such as LANs, WANs, the Internet, etc. Network interface 1218 may interface with remote sites or networks via wired or wireless connections.

Control logic 1228C may be transmitted to and from computer 1200 via the communication medium 1242.

Any apparatus or manufacture comprising a computer useable or readable medium having control logic (software) stored therein is referred to herein as a computer program product or program storage device. This includes, but is not limited to, computer 1200, main memory 1206, secondary storage devices 1210, and removable storage unit 1216. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for search engine 106, advertisement selector 116, search system 120, search system 302, topic identification module 304, content generation module 308, topic identification module 400, keyword determiner 402, query identifier 404, query grouper 406, cluster merger 408, URL dominance determiner 410, graph generator 420, graph analyzer 422, graph generator 424, graph analyzer 426, content generation module 900, document retriever 902, content generator 904, page creator 906, user interest score calculator 922, advertiser interest score calculator 924, URL dominance score calculator 926, flowchart 500, flowchart 600, flowchart 700, flowchart 800 and/or flowchart 1000 (including any one or more steps of the flowcharts), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for identifying a query topic unassociated with a dominant URL (uniform resource locator), the method comprising:
receiving an identification of a set of keywords associated with a query topic;
scanning a search log to identify search queries associated with the set of keywords;
grouping the identified search queries into clusters, wherein each of the clusters is associated with at least one URL returned by a search engine when performing a search for information using one or more of the identified search queries;
merging the clusters to generate an extended seed query string;
determining whether the extended seed query string is associated with a dominant URL by calculating a URL dominance score for queries of the extended seed query; and
if the calculated URL dominance score is within a threshold range, the extended seed query is unassociated with a dominant URL, generating a web page associated with the query topic, including
retrieving documents associated with queries of the extended seed query string;
generating a compilation document that includes the retrieved documents;
calculating term frequency-inverse document frequency (TF-IDF) scores for n-grams (w) of phrase consisting of n consecutive words within the compilation document; and
outputting the n-grams (w) having TF-IDF scores above a predetermined threshold;
wherein the TF-IDF score for the n-grams (w) is calculated by multiplying term frequency (TF) and inverse document frequency (IDF), where TF represents the number of times the n-gram (w) is contained within the document d, and IDF represents the total number of documents (by URL) divided by the number of documents that contain the n-gram.

2. The method of claim 1, further comprising:
generating a title and content for the identified query topic; and
creating a web page for the identified query topic using the generated title and content.

3. The method of claim 1 wherein receiving an identification of a set of keywords associated with a query topic includes receiving input from a user identifying keywords of the set of keywords.

4. The method of claim 1 wherein receiving an identification of a set of keywords associated with a query topic includes:
scanning a bid query log that relates queries with bids associated with sponsorship of the queries;
clustering queries of the bid query log; and
selecting a set of keywords that includes at least one of the clustered queries.

5. The method of claim 1, wherein determining whether the extended seed query string is associated with a dominant URL includes:
calculating a first score associated with a user interest in the extended seed query string;
calculating a second score associated with an advertiser interest in the extended seed query string;
calculating a third score associated with a dominance of one or more URLs associated with the extended seed query string; and
if one or more of the first score, second score, and third score satisfy a predetermined criteria, determining that the extended seed query string is unassociated with a dominant URL.

6. The method of claim 1, wherein determining whether the extended seed query string is associated with a dominant URL includes:
calculating a score associated with a dominance of one or more URLs associated with the extended seed query string; and
if the calculated score satisfies a predetermined threshold, determining that the extended seed query string is unassociated with a dominant URL.

7. The method of claim 1, wherein grouping the identified search queries into clusters includes generating an impression graph that associates search queries to URLs.

8. A method for creating a web page associated with a topic, the method comprising:
receiving information associated with a query topic determined to be unassociated with a dominant URL (uniform resource locator);
generating content for a web page related to the query topic;
and creating a web page that includes the generated content,
receiving an identification of a set of keywords associated with the query topic;
scanning a log of search queries to identify search queries associated with the set of keywords;
grouping the identified search queries into clusters, wherein each of the clusters is associated with at least one URL returned by a search engine when performing a search for information using one or more of the identified search queries;
merging the clusters to generate an extended seed query string;
determining whether the extended seed query string is associated with a dominant URL by calculating a URL dominance score for queries of the extended seed query; and
if the calculated URL dominance score is within a threshold range, the extended seed query is unassociated with a dominant URL, creating the web page;
wherein generating content for a web page related to the query topic includes:
retrieving documents associated with queries of the extended seed query string;
generating a compilation document that includes the retrieved documents;
calculating TF-IDF scores for n-grams (w) of phrase consisting of n consecutive words within the compilation document; and
outputting the n-grams (w) having TF-IDF scores above a predetermined threshold;
wherein the TF-IDF score for the n-gram (w) calculated by multiplying term frequency (TF) and inverse document frequency (IDF), where TF represents the number of times the n-gram (w) is contained within the document d, and represents the total number of documents (by URL) divided by the number of documents that contain the n-gram.

9. The method of claim 8, wherein creating the web page comprises:

generating a title for the web page based on the generated content.

10. The method of claim 8, wherein creating the web page comprises:
generating body text for the web page based on the generated content.

11. The method of claim 8, wherein receiving information associated with a query topic determined to be unassociated with a dominant URL includes:
receiving information identifying a score associated with a user interest in the query topic;
receiving information identifying a score associated with an advertiser interest in the query topic; and
receiving information identifying a score associated with a dominance of one or more URLs associated with the query topic.

12. A system for outputting content to be displayed by a web page, the system comprising:
one or more processors operable with computer program code to implement:
a topic identification module that is configured to identify one or more topics unassociated with a dominant URL (uniform resource locator); and
a content generation module that is configured to generate content for a web page associated with the identified one or more topics unassociated with the dominant URL and transmit the content for the webpage;
receiving an identification of a set of keywords associated with the query topic;
scanning a log of search queries to identify search queries associated with the set of keywords;
grouping the identified search queries into clusters, wherein each of the clusters is associated with at least one URL returned by a search engine when performing a search for information using one or more of the identified search queries;
merging the clusters to generate an extended seed query string;
determining whether the extended seed query string is associated with a dominant URL
by calculating a URL dominance score for queries of the extended seed query; and
if the calculated URL dominance score is within a threshold range, the extended seed query is unassociated with a dominant URL, creating the web page;
wherein generating content for a web page related to the query topic includes:
retrieving documents associated with queries of the extended seed query
string; generating a compilation document that includes the retrieved
documents;
calculating TF-IDF scores for n-grams (w) of phrase consisting of n
consecutive words within the compilation document; and outputting the n-grams (w) having TF-IDF scores above a predetermined
threshold;
wherein the TF-IDF score for the n-grams (w) calculated by multiplying term frequency (TF) and inverse document frequency (IDF), where TF represents the number of times the n-gram (w) is contained within the document d, and represents the total number of documents (by URL) divided by the number of documents that contain the n-gram.

13. The system of claim 12, wherein the topic identification module includes:
a keyword receiver that is configured to receive a set of keywords associated with a query topic;
a query identifier that is configured to scan a log of search queries to identify search queries associated with the set of keywords;
a query grouper that is configured to group the identified search queries into clusters, wherein each of the clusters is associated with at least one URL returned by a search engine when performing a search for information using one or more of the identified search queries;
a cluster merger that is configured to merge clusters associated with similar URLs to generate an extended seed query string; and a URL dominance determiner that is configured to determine whether the extended seed query string is associated with a dominant URL.

14. The system of claim 12, wherein the content generation module includes:
a document retriever that is configured to retrieve one or more documents associated with the identified one or more topics;
a content generator that is configured to generate content for a web page related to the identified one or more topics based on the retrieved one or more documents; and
a page creator that is configured to create a web page that includes the generated content.

15. The system of claim 14, wherein the content generator IS configured to generate content from which a title of the web page is selected by page creator.

16. The system of claim 14, wherein the content generator is configured to generate content from which body text of the web page is selected by page creator.

17. The system of claim 13, wherein the URL dominance determiner includes:
a user interest score calculator that is configured to calculate a score associated with a user interest in the identified one or more topics;
an advertiser interest score calculator that is configured to calculate a score associated with advertiser interest in the identified one or more topics; and
a URL dominance score calculator that is configured to calculate a score associated with dominance of a single URL for the identified one or more topics.

* * * * *